May 3, 1960 K. TEER ET AL 2,935,568

AUXILIARY-CARRIER TELEVISION RECEIVER

Filed Dec. 23, 1954 2 Sheets-Sheet 1

INVENTORS
KEES TEER
HALVOR NYGARD
BY Fred M. Vogel
AGENT

AUXILIARY-CARRIER TELEVISION RECEIVER

Filed Dec. 23, 1954 2 Sheets-Sheet 2

INVENTORS
KEES TEER
HALVOR NYGARD
BY Fred M. Vogel
AGENT

United States Patent Office 2,935,568

Patented May 3, 1960

2,935,568

AUXILIARY-CARRIER TELEVISION RECEIVER

Kees Teer and Halvor Nygard, Eindhoven, Netherlands, assignors, by mesne assignments, to North American Philips Company, Inc., New York, N.Y., a corporation of Delaware Application December 23, 1954, Serial No. 477,164

Claims priority, application Netherlands January 5, 1954

5 Claims. (Cl. 179—15)

The invention relates to a circuit arrangement in a television receiver for detecting an auxiliary carrier lying in the band of a television signal. Such an auxiliary carrier may serve for example for the transmission of a further television signal, in general having a smaller bandwidth than the first mentioned television signal. In the case of colour television the first-mentioned signal contains for example information about the brightness of a scene to be reproduced and the other television signal may contain information about the colour of this scene. If the colour television system is a trichrome system, the auxiliary carrier may be modulated for a given period by a signal relating to a first colour, for a next following period by a signal relating to a second colour, for the further following period again by a signal relating to the first colour and so on. In this case the band of the first-mentioned television signal may contain two auxiliary carriers, each of which is modulated by a signal relating to a given colour content of the scene to be reproduced.

Such systems have the advantage that at the receiver end the signals having a smaller bandwidth may be reproduced simply by rectification, i.e. without the need for producing these auxiliary carriers with the correct frequency and phase in the receiver and for mixing them with the incoming auxiliary carriers.

It is known that in both cases during the reception of the image produced by the signal having a large bandwidth interferences occur, which are produced by the auxiliary carriers with the signals modulated thereon. If there is only one auxiliary carrier within the frequency band of the first-mentioned signals and if the image produced by these signals consists of an odd number of lines in two interlaced frames, the interferences produced by the auxiliary carrier in this image appear to be practically not troublesome to the eye, if the frequency of this auxiliary carrier is chosen to be equal to an odd-numbered multiple of half the line frequency. This phenomenon is based on the fact that with this choice of the auxiliary carrier frequency an interference of a given line is obviated for the major part during the next following scanning of this line, since the phase difference of the auxiliary carrier at two instants spaced apart by one image period is $\pi$ radians. Strictly speaking, this applies only to the case in which the signals modulated on this auxiliary carrier do not vary from image to image. If this variation is not great, this will, as is known, also be the case to a great approximation for signals which do not exhibit the same form during each frame period. Moreover, the energy of the auxiliary carrier is in general low with respect to the energy of the signal having a large bandwidth.

Also for the use of more than one auxiliary carrier methods are known to suppress as far as possible the interference of these auxiliary carriers in the image produced by the signal having a large bandwidth.

Conversely, interferences also occur in the image produced by the signal modulated on the auxiliary carrier, i.e. interferences produced by the signal having a large bandwidth. It is known that it may be proved that the frequencies of the signal having a large bandwidth, considered as sidebands of the auxiliary carrier, produce interferences in the image of the signal modulated on the auxiliary carrier, these interferences having the same phase relationship on a given line during successive scannings as the interferences produced by the auxiliary carrier in the image of the signal having a large bandwidth, so that as the latter interferences, they are little troublesome.

If the detection of the auxiliary carrier is carried out with the aid of an auxiliary carrier produced in the receiver and having the same frequency and phase (synchronous detection), the frequencies of the signal having a large bandwidth will behave indeed as sidebands of the auxiliary carrier; this will also be the case, if the detection is carried out with the aid of a diode or another nonlinear element and the auxiliary carrier is large enough relative to the disturbing frequencies of the signal having a large bandwidth.

However as stated above, the auxiliary carrier will, as a rule, be small and with 100% modulation depth of the auxiliary carrier, it may even occur that for some time the auxiliary carrier does not occur at all. In this case, however, the interference is constituted by a signal which is, of course, independent of the phase and the frequency of the auxiliary carrier and the said phase relationship on a given line of the image during successive scannings of this line does not occur, so that the interference will certainly be troublesome.

The circuit arrangement according to the invention reduces this disadvantage to a great extent and has the feature that the output signal of the bandpass filter to which the television signal is applied and which has a pass range for the auxiliary carrier with its sidebands, is supplied on the one hand to a detector which determines one envelope and on the other hand to a detector which determines the other envelope, after which the two resultant detected signals are combined in a positive sense.

The invention will be described more fully with reference to the figures of the drawing.

Fig. 1 shows the frequency spectrum of a television signal with frequencies between 0 and $f_s$ and of an auxiliary carrier lying within the frequency band of this signal and having a frequency $f_h$ and of sidebands of the auxiliary carrier having frequencies $f_a$ and $f_b$.

The frequency $f_h$ of the auxiliary carrier is chosen to be such that the interferences in the image of the signal having frequencies between 0 and $f_s$, these interferences being due to the auxiliary carrier with its sidebands, are substantially imperceptible to the eye. If the image is built up from an odd number of lines, the frequency of the auxiliary carrier may, as is known be chosen to be an odd numbered multiple of half the line frequency.

In order to detect the signal modulated on the auxiliary carrier, the television signal will be fed to a bandpass-filter having a pass range such that the frequencies between $f_a$ and $f_b$ can be separated. From Fig. 1 it will be evident that in this case the frequencies of the signal having frequencies between 0 and $f_s$ within this pass range will also pass through the bandpass filter. If the energy of the latter frequencies is small with respect to the energy of the auxiliary carrier, these frequencies may, as stated above, be considered, even with non-synchronous detection, as sideband frequencies of the auxiliary carrier and owing to the choice of the frequency of the auxiliary carrier the interferences in the image of the signal modulated on the auxiliary carrier, these interferences being due to the signal having a large bandwidth will also be substantially imperceptible to the eye.

However, if the auxiliary carrier is small with respect to these frequencies, or if the auxiliary carrier fails altogether, this is no longer the case.

Figure 2:
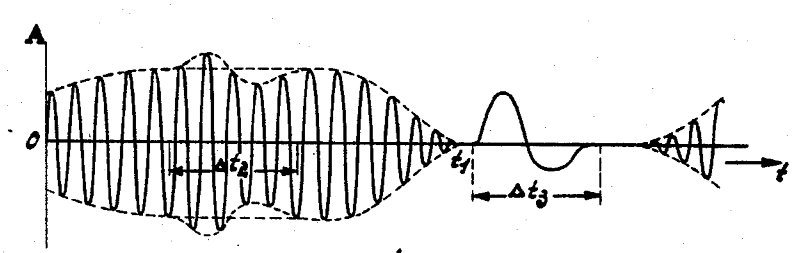
Figure 3:
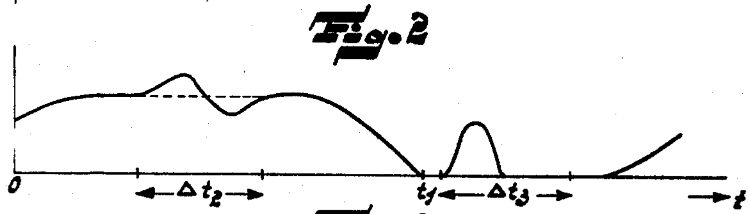
Figure 4:
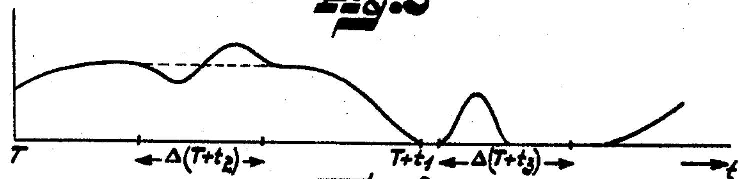

Fig. 2 shows various possibilities for the output signal of the bandpass filter; the amplitude A of the signal passing the bandpass filter is plotted herein as a function of time $t$. The full line between the instants $t=0$ and $t=t_1$ represents the modulated auxiliary carrier and the broken line the envelope of this auxiliary carrier. During $\Delta t_2$ the signal having a large bandwidth is supposed to produce an interference which is small with respect to the amplitude of the auxiliary carrier and which becomes manifest as a modulation of the auxiliary carrier. During $\Delta t_3$ the interference is indicated in the absence of the auxiliary carrier. If such a signal is applied to a detector circuit comprising a unidirectional element with the associated RC-network, it is found that a signal is produced as is shown in Fig. 3. If this signal is applied to a control-element of a television reproducing tube, the interference occurring during $\Delta t_2$ is found to be substantially imperceptible to the eye, since if the output signal of the detector is considered one frame period later, it has the waveform indicated in Fig. 4. T designates herein the duration of one frame period.

The interference during $\Delta t_2$ has a polarity opposite to the interference during $\Delta(T+t_2)$, owing to the choice of the frequency of the auxiliary carrier. Owing to the inertia of the eye only the average of the interference is observed and this is exactly zero. However, the interferences during $\Delta t_3$ and $\Delta(T+t_3)$ have no opposite polarities, so that they amplify one another.

In a situation between the cases occurring during $\Delta t_2$ and $\Delta t_3$, i.e. a situation in which during the occurrence of the interference the auxiliary carrier is present, but not to an extent sufficient to avoid over-modulation, the interference in the detector output can be split up into two components, of which one behaves as the interference during $\Delta t_2$ (which is thus compensated by an interference during $\Delta(T+t_2)$ and the other inter component as the interference during $\Delta t_3$ (which is thus amplified by an interference during $\Delta(T+t_3)$.

Figure 1:
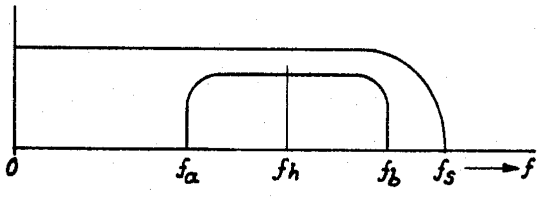
Fig. 1 shows a television signal with an auxiliary carrier lying in the band of the signal.
Figure 5:
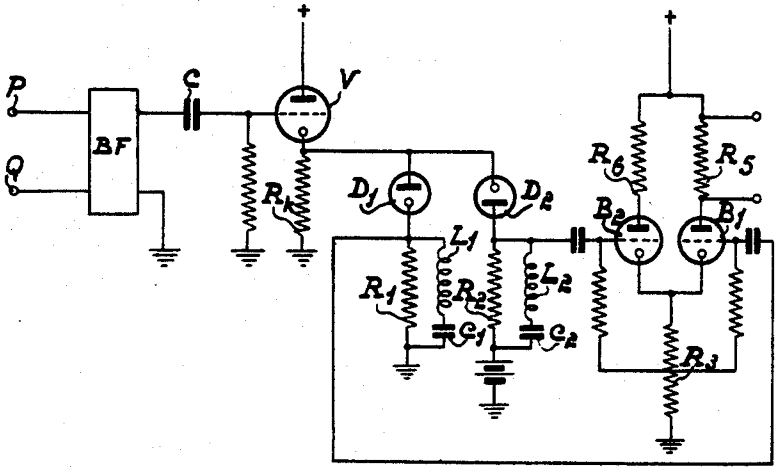
Fig. 5 shows one embodiment of the circuit arrangement according to the invention.

Fig. 5 shows a circuit-arrangement according to the invention. The television signal shown in Fig. 1 is fed to the input terminals P and Q of the bandpass filter BF, which passes the auxiliary carrier with its sidebands. The output signal of BF is first supplied in the embodiment shown to the control-grid of an amplifying tube V and derived from the cathode resistor $R_k$ of this tube. The direct voltage across $R_k$, produced by the direct anode current flowing through the tube, is assumed to be a volt. The cathode of the tube is connected on the one hand to the anode of a diode $D_1$ and on the other hand to a cathode of a diode $D_2$. The cathode of $D_1$ is connected to earth through the parallel combination of a resistor $R_1$ and a circuit $L_1$—$C_1$, tuned to the frequency of the auxiliary carrier. The anode of $D_2$ is connected through the parallel combination of a resistor $R_2$ and a circuit $L_2$—$C_2$, also tuned to the frequency of the auxiliary carrier, to the positive terminal of a battery having a terminal voltage of $2a$, the negative terminal of which is connected to earth.

Figure 6:
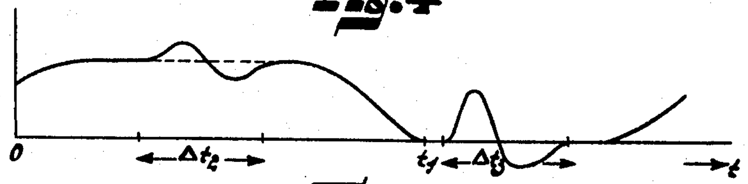

For a satisfactory operation of the arrangement it is desirable that the elements $D_1$, $R_1$, $L_1$ and $C_1$ should be substantially identical with the corresponding elements $D_2$, $R_2$, $L_2$ and $C_2$. By the said choice of the direct voltages the diodes are also adjusted identically. If the signal across $R_k$ has again the waveform shown in Fig. 2, a signal as indicated in Fig. 6 will occur across $R_1$ and not a signal as indicated in Fig. 3, as in the case of a conventional detector having no adjusting bias voltage. Owing to the bias voltage applied the negative parts of the interferences can now occur across the resistor. A signal of the waveform shown in Fig. 7 will occur across the resistor $R_2$. This signal is constituted by the lower envelope of the signal shown in Fig. 2 and, apart from the interferences during $\Delta t_3$, it is identical in form with the signal across the resistor $R_1$, having, however, opposite polarity; the interferences during $\Delta t_3$ are both in form and polarity identical.

Figure 7:
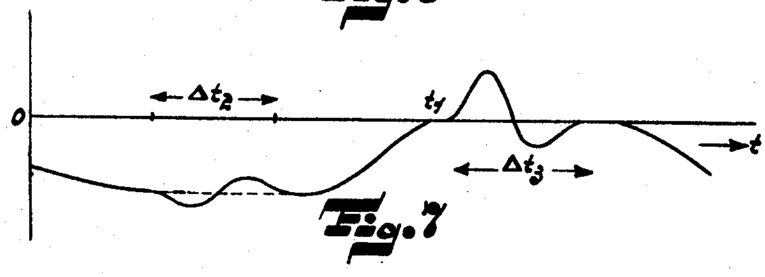

If the two envelopes are combined in a positive sense or in other words, if the signals shown in Figs. 6 and 7 are subtracted one from the other, the resultant signal is free from interferences during $\Delta t_3$. The interference during $\Delta t_2$ is not suppressed, but its influence is neutralized to the eye by an interference having opposite polarity and occurring one frame period later.

The signal across resistor $R_1$ may be designated by $E_1=e+s$; the signal across resistor $R_2$ by $-E_2=-e+s$. $e$ designates the envelope without the interference during $\Delta t_3$ and $s$ is exactly equal to these interferences.

In order to obtain the desired signal $E_1+E_2$, $E_1$ may for example be applied to the control-grid of a tube $B_1$ and $E_2$ to a control-grid of a tube $B_2$. The two tubes, which must be substantially identical, have a common cathode resistor $R_3$ and are connected to a common anode battery through anode resistors $R_5$ and $R_6$. Across each of the resistors $R_5$ and $R_6$ occurs a signal which is proportional to the desired signal $E_1+E_2$, since the alternating current $i_1$ through $R_5$ is: $i_1=S(E_1-E_k)$ and the alternating current $i_2$ through $R_6$ is: $i_2=S(-E_2-E_k)$, wherein S designates the dynamic conductance of the tubes $B_1$ and $B_2$ and $E_k$ the cathode voltage. If it is assumed that the alternating current through $R_3$ is equal to $i_1+i_2$, which is approximately the case, $i_1+i_2$ is equal to $$S(E_1-E_2-2Ek)=\frac{E_k}{R_3}$$

so that $$E_k=\frac{SR_3(E_1-E_2)}{2R_3S+1}$$

from which follows $$i_1=\frac{S[E_1(R_3S+1)+E_2SR_3]}{2R_3S+1}$$

$R_3$ is now chosen to be such that $R_3S \gg 1$, so that $$i_1=S\cdot\frac{E_1+E_2}{2}$$

The current $i_2$ is opposite thereto.

Figure 8:
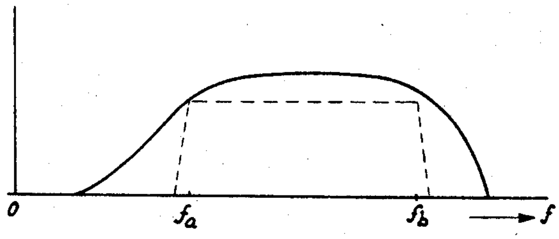
Figs. 2, 3, 4, 6, 7 and 8 show curves to explain the invention.

By experiments it has now been found that the operation of a circuit arrangement according to the invention is affected adversely by bandpass filters BF having sharply defined cut-off frequencies. A bandpass filter having a pass characteristic as shown in Fig. 8 by broken lines yields materially better results in the arrangement according to the invention than a single detector, but with certain structures of the signal having a large bandwidth the experienced observer may still perceive irregularities in the image of the signal modulated on the auxiliary carrier. They are found to vanish substantially entirely by using a bandpass filter having a pass characteristic as shown in Fig. 8 by full lines, in which particularly the cut-off on the side of the low frequencies is preferably very gradual. If the coupling capacitor C is a capacitor of comparatively low capacity, the bandpass filter BF may, if required, be dispensed with.

It should be noted that it is, of course, not necessary to use diodes as non-linear elements. It is, however, required that both the positive and the negative parts of the interferences must be followed, i.e. rectifiers without bias voltage cannot be used.

It should be noted that the use of an $L_1$—$C_1$ circuit and an $L_2$—$C_2$ circuit as in the arrangement shown in Fig. 5 instead of the use of only one capacity, is to be preferred in connection with the fact that the maximum modulation frequency of the auxiliary carrier ($f_h - f_a$ or $f_b - f_h$) is not very small with respect to the frequency $f_h$ of the auxiliary carrier. With a suitable choice of $L_1$—$C_1$ and $L_2$—$C_2$ the low-pass filter used normally after the detector may, if required, be dispensed with.

What is claimed is:

1. A television receiver circuit for detecting a modulated auxiliary carrier signal lying within the bandwidth of a modulated television signal, comprising a bandpass filter having a bandwidth for passing said auxiliary carrier and its modulation sidebands, means connected to feed said signals into said filter, a first detector connected to receive the output signal of said filter and polarized to detect the full extent of the positive-polarity excursions of the said output signal, said detector being biased thereby to transmit therethrough negative-polarity excursions of limited extent of said output signal, a second detector connected to receive the output signal of said filter and polarized to detect the full extent of the negative-polarity excursions of the said output signal, said second detector being biased thereby to transmit therethrough positive-polarity excursions of limited extent of said output signal, and means connected to said detectors to combine the detected signals in a positive sense.

2. A circuit as claimed in claim 1, in which said bandpass filter comprises means for producing a characteristic curve which exhibits a relatively more gradually declining pass characteristic at the lower sideband frequencies of said modulated auxiliary carrier than at the higher side band frequencies thereof.

3. A circuit as claimed in claim 1, in which each of said detectors comprises a unidirectional element and wherein the biasing means for said first detector means comprising an electron tube connected as a cathode-follower amplifier and having a grid connected to the output of said bandpass filter and a cathode conductively connected to an electrode of the unidirectional element of said first detector, and a resistor connected to said cathode whereby a bias voltage for said electrode is developed across said resistor by the cathode current in said tube.

4. A circuit as claimed in claim 1, in which each of said detectors comprises a unidirectional element and a circuit tuned to the frequency of said auxiliary carrier and connected in series with the respective unidirectional element.

5. A circuit as claimed in claim 1, in which said detectors are connected in parallel, and including a pair of substantially identical amplifier devices each having an input electrode, an output electrode and a common electrode, an impedance connected at an end thereof to both of said common electrodes, means connected to feed the detected signals to said input electrodes, respectively, and an output impedance connected to at least one of said output electrodes.

References Cited in the file of this patent

UNITED STATES PATENTS

| | | |
|---|---|---|
| 1,906,269 | Hough | May 2, 1933 |
| 2,352,634 | Hull | July 4, 1944 |
| 2,607,035 | Levine | Aug. 12, 1952 |
| 2,635,140 | Dome | Apr. 14, 1953 |
| 2,664,462 | Bedford et al. | Dec. 29, 1953 |
| 2,692,333 | Holmes | Oct. 19, 1954 |
| 2,716,151 | Smith | Aug. 23, 1955 |